United States Patent [19]

Fresow et al.

[11] 4,127,092

[45] Nov. 28, 1978

[54] ADJUSTABLE TIMING ELECTRONIC INTERNAL COMBUSTION ENGINE IGNITION SWIT SYSTEM

[75] Inventors: Jürgen Fresow, Schwieberdingen; Bert Wurst, Möglingen, both of Germany

[73] Assignee: Robert Bosch GmbH, Stuttgart, Germany

[21] Appl. No.: 795,742

[22] Filed: May 11, 1977

[30] Foreign Application Priority Data

May 26, 1976 [DE] Fed. Rep. of Germany ....... 2623613

[51] Int. Cl.² .............................................. F02P 5/04
[52] U.S. Cl. ............................ 123/117 D; 123/117 R; 123/148 E; 123/146.5 A
[58] Field of Search ........... 123/117 D, 117 R, 148 E, 123/146.5 A

[56] References Cited

U.S. PATENT DOCUMENTS

| | | | |
|---|---|---|---|
| 3,908,616 | 9/1975 | Sasayama | 123/117 D |
| 3,919,987 | 11/1975 | Haubner | 123/117 D |
| 3,955,723 | 5/1976 | Richards | 123/117 D |
| 4,018,202 | 4/1977 | Gartner | 123/117 D |
| 4,036,190 | 7/1977 | Bigliani et al. | 123/117 D |

FOREIGN PATENT DOCUMENTS

| | | | |
|---|---|---|---|
| 2,248,420 | 5/1975 | France | 123/117 D |
| 1,402,268 | 8/1975 | United Kingdom | 123/117 D |
| 1,470,517 | 4/1977 | United Kingdom | 123/117 D |

*Primary Examiner*—Charles J. Myhre
*Assistant Examiner*—P. S. Lall
*Attorney, Agent, or Firm*—Flynn & Frishauf

[57] ABSTRACT

A universally applicable system should permit easy matching of ignition timing characteristics to specific engines. In order to control a digital electronic ignition system, a marker signal is generated when a piston has reached a predetermined angular position with respect to upper dead center (UDC) position, and additional marker signals are generated as the piston moves, for example by sensing the teeth on a starwheel coupled to the engine or, for example, in an automotive engine by providing signals each time a tooth of the starter gear passes by a transducer. Two counter stages are provided which go through two count cycles for any one ignition event. The marker starts counting of both counters. The first counter stage counts for a predetermined time interval to provide a speed-dependent output number which is stored in a multiplex or memory stage, the output of which is blocked while the second counter counts. Upon the second count cycle, the second counter provides an output signal representative of an angular position with respect to UDC position, which is representative of the count state stored in the multiplex or memory circuit when deriving the speed-representative number. By changing the initial or final count during the second count cycle in the second counter, the ignition timing as a function of additional operating parameters can be considered.

20 Claims, 3 Drawing Figures

ADJUSTABLE TIMING ELECTRONIC INTERNAL COMBUSTION ENGINE IGNITION SWIT SYSTEM

Prior art with respect to the present invention:

German Disclosure Document No. DT-OS 2,407,183
U.S. appl. Ser. No. 660,858 (Feb. 24, 1976)
U.S. Pat. No. 3,919,987
U.S. Pat. No. 3,934,563
U.S. Pat. No. 3,946,709
U.S. Pat. No. 3,955,723
U.S. Pat. No. 3,976,043.

The present invention relates to an ignition system for internal combustion engines, and more particularly to an adjustable timing electronic ignition system which is simple and permits ready matching of the system to different types of internal combustion engines, so that the ignition timing characteristic curves of the engine with respect to operating parameters, principally speed, can be readily considered without substantial modification of the components of the system.

BACKGROUND AND PRIOR ART

An ignition system has previously been proposed — see German Disclosure Document No. DT-OS 2,407,183 — in which a disk or the like, with markers located thereon, is coupled to the shaft of the engine. The markers are sensed by transducers to provide output signals representative of the angle of the shaft, at any instant of time, with respect to a fixed angular position corresponding, for example, to the upper dead center (UDC) position of a piston. The signals so derived provide information to control the timing adjustment system. An ignition coil is provided, in the primary circuit of which an electronic switch is placed which, for any ignition event, is opened to provide a sharp voltage pulse at the secondary, causing flash-over of a spark at a spark plug. The system uses a counter stage to generate a signal proportional to, or representative of engine speed. A second counter stage is provided to generate a signal proportional to angular position of the crankshaft. The ignition signal is generated by connecting the outputs of the counter to a storage or multiplex circuit. The counters are so arranged that the second counter, providing output signals representative of instantaneous angular position, goes through only one count cycle for any ignition event. This system requires a third transducer element in order to control counting in the second counter stage. The necessity of three transducers is a disadvantage; the control element, rotating with the crankshaft of the engine, is comparatively complex and requires relatively shifted segmental sections which, separately, control the various fixed transducers. It is possible to use a specially constructed control disk to match the output to specific engines; since specially constructed disks are necessary for different engine types, use of the system with engines of different types is restricted, and change in the ignition spark timing characteristics with respect to engine operation under different conditions is limited.

The invention:

It is an object to simplify the system and provide a system which can be applied essentially universally to many different types of engines, without essential modifications, by permitting matching of the engine operation — ignition timing characteristics of the system to specific engines without substantial modification thereof.

Briefly, two counter stages are provided which are so arranged that they go through two count cycles for any one ignition event. One counter stage receives speed-dependent signals, for example by counting the number of sequentially occurring pulses representative of instantaneous angular position of the crankshaft during a predetermined time period. The resulting count number is stored in a multiplex or memory stage, which has, additionally, applied thereto signals representative of the instantaneous angular position of the crankshaft, derived from a second counter. A blocking stage inhibits generation of an output signal from the multiplex or memory stage while the first counting cycle occurs, that is, while the speed-dependent signals are entered therein. The count number of the speed-dependent signal is passed through logic or decode circuits to store in the multiplexing circuit a number representative of a predetermined angular spark advance, for example, commanded by a specific engine speed. The second counter, during the second count cycle thereof, counts to a number which corresponds to the number stored in the memory or multiplexing circuit; its initial or final possible count number can be controlled, however, to thereby introduce into the final output result, information relating to further operating parameters, for example throttle position, or the like. The blocking circuit is released from providing an output signal to the controlled switch, which generates the ignition event, after the first count cycle of one of the counters, preferably the second counter, has terminated.

The system has the advantage that the transducer disk can be simple, and be a starwheel with uniform tooth or star distribution. In a simple form, the fixed transducer element can be located to sense passage of the teeth of the starter gear attached to the engine crankshaft. This permits use of a transducer disk which is essentially symmetrical. Only two transducers are necessary to control the ignition system. Yet, it can be readily changed with respect to specific ignition-operating characteristic curves associated with specific engines. Additional marker teeth, to be associated with only one further transducer, can readily be placed on the gear ring to control specific ignition events and specific cylinders of a multi-cylinder engine.

The basic system, as described, can be further improved since only a simple switch is required in order to shift the characteristic. This switch is connected to the reset circuit of the second counter stage and is operated in dependence on a further parameter of the engine. Thus, if the switch is operated, reset of the second counter stage will occur at a count state which is other than if the switch is not operated, thus resulting in a shift of the characteristic. The ignition timing characteristic can be made flat from a certain speed range onward by suitably connecting decoding stages to the counters, for example to block application of count pulses to terminals of the multiplex or memory circuit, or to suitable other logic stages.

The system additionally permits reduction of power losses in the ignition coil by including a timing circuit in the output from the multiplex or memory stage, and controlled by the first counter which provides the speed-dependent count output, so that the current flow through the coil is limited to that required to store magnetic energy for generation of a spark upon opening of the circuit through the spark plug, but not for extended periods of time.

Drawings, illustrating an example:

Figure 1:
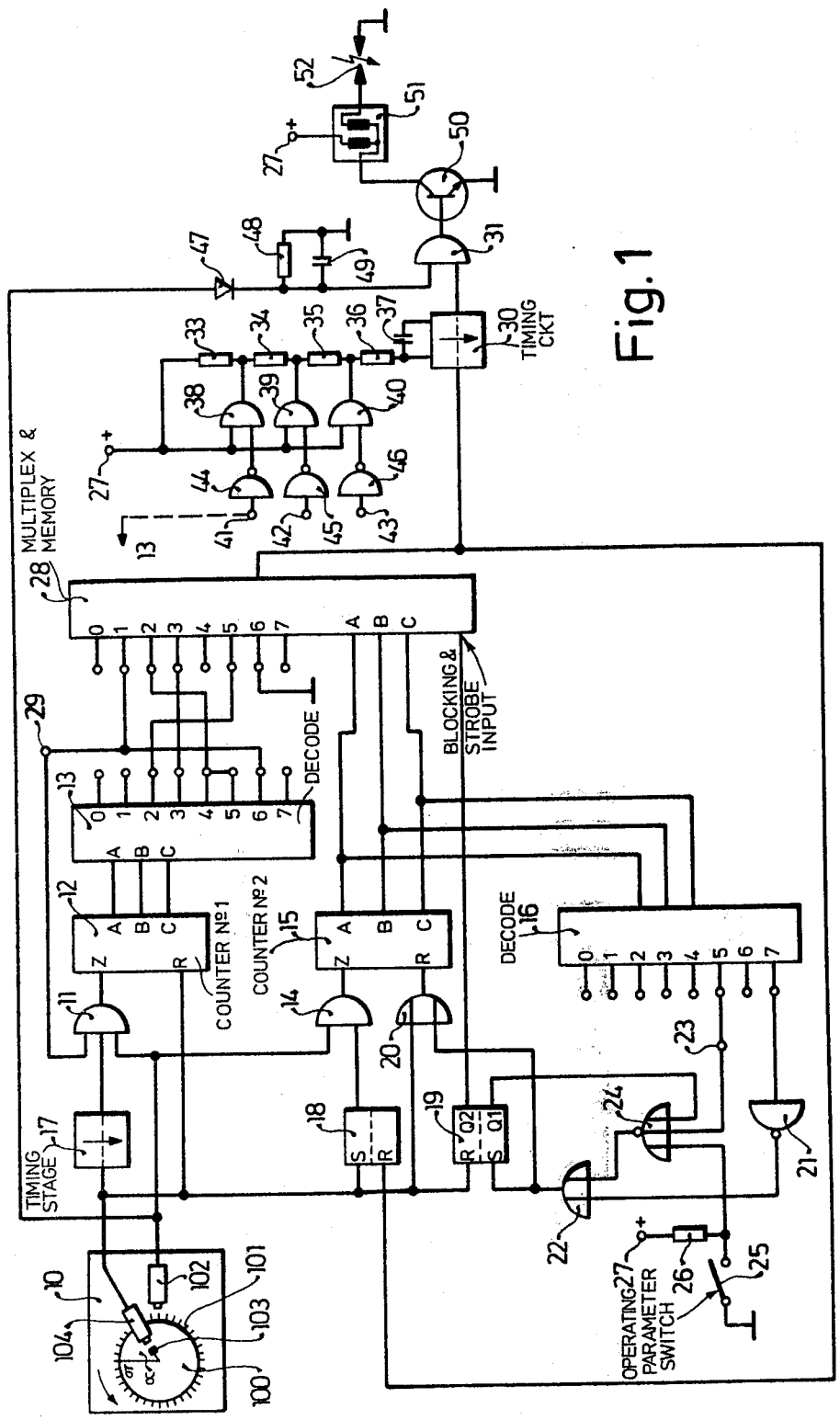
FIG. 1 is a schematic circuit diagram, partly in block form, of the ignition system.

A transducer system 10 provides output pulses. System 10 includes a starwheel 100 on which teeth 101 are located, uniformly distributed on its circumference. Starwheel 100, 101 in one form may be the starter gear of an automotive internal combustion engine. The teeth are scanned by a first fixed transducer 102. As the teeth pass the transducer, changes in inductivity therein generate output signals. The teeth are preferably magnetized; rather than using magnetized teeth, other types of markers may be used which can be scanned by a transducer. For example, a disk can be coupled to the crankshaft of the internal combustion engine (not shown) which is magnetized in strip form along the circumference thereof; it may be formed with openings which can be scanned optically.

The disk includes additionally a reference marker 103 which is placed at a predetermined angular position α with respect to UDC position of a cylinder; a plurality of such reference markers 103 can be provided dependent on the number of desired ignition events for each revolution of disk 100, that is, proportional to the numbers of the cylinders of the internal combustion (IC) engine. The reference markers 103 may, of course, be located on a separate disk and merely coupled to disk 100. Reference markers 103 are scanned by a second inductive transducer 104. The output signals derived from the transducers 102, 104 are wave-shaped in suitable wave-shaping stages, not shown, to provide square wave signals of predetermined, readily processed wave form.

The first transducer 102 which provides a plurality of signals, each representative of the instantaneous angular position of the crankshaft, is connected through an AND-gate 11 to the count input Z of a first counter stage 12. Counter stage 12 is a three-bit counter having three outputs A, B, C, which are connected to respective inputs A, B, C of a first decoding stage 13. Decoding stage 13 provides a binary-to-decimal output and has eight decimal output terminals 0 to 7. The first transducer 102 is additionally connected to one input of a second AND-gate 14, the output of which is connected to the count input Z of a second 3-bit counter 15 which, in turn, has its output terminals A, B, C connected to a second decoding stage 16, similar to the connection between counter 12 and decoding stage 13.

The marker transducer 104, generating an angle marker signal containing information regarding the angular position of the crankshaft with respect to a reference position — typically the UDC position — is connected to a timing stage 17 which, for example, is a monostable circuit. The output of the monostable circuit is connected as a second input to the AND-gate 12. The marker transducer 104 is further connected to the reset input R of the first counter 12. It is additionally connected to the SET input of a first flip-flop 18 and to the RESET input of a second flip-flop 19. The marker transducer 104 is additionally connected through an OR-gate 20 with the reset input of the second counter stage 15.

The output of the first flip-flop 18 is connected to a further input of AND-gate 14. The output from the highest stage of decoding circuit 16, that is, the output corresponding to number 7, is connected through an inverter 21 with an OR-gate 22 and then to the SET input of the second flip-flop (FF) 19. A further output of the second decoding stage 16 which can be suitably selected — as shown, output representative of number 5 — is connected to a terminal 23 and then through an NOR-gate 24, the output of which is connected to a further input of the OR-gate 22. A switch 25, connected with one terminal to ground or chassis and with the other to a source of positive supply 27 through a resistor 26, is additionally connected as a further input to the NOR-gate 24. The switch 25 is operable in dependence on selected parameters, particularly engine operating parameters such as, for example, pressure (or, rather, vacuum) in the induction pipe of the engine. The NOR-gate 24 has a further input connected to the Q1 output of the first FF 19. The complementary output Q2 of FF 19 is connected to a blocking and strobe input of a multiplex or memory stage 28. The strobe input is so connected to the multiplex stage 28 that, upon application of a signal to the blocking and strobe input, the multiplex stage 28 stores inputs, but cannot provide an output. The strobe input terminal therefore functions also as a blocking terminal.

The three binary outputs of the second counter 15 are connected to corresponding address inputs A, B, C of the multiplex stage 28. The multiplex stage 28 further has eight decimal data inputs 0 to 7 which can be connected to the eight outputs of the first decoding stage 13 in freely selectable form. Connection of the multiplex stage 28 to the respective terminals of decoding stage 13 permit matching of the ignition angle adjustment function or characteristic to specific engines. In the example shown, the output 2 of decoding stage 13 is connected with the input 5 of multiplex stage 28; output 3 with input 3; outputs 4 and 5 with the input 2; and output 6 with the input 1. The output 6 of the decoding stage is additionally connected to a terminal 29 and then to a further input of the first AND-gate 11. The output 6 of the multiplex stage 28 is connected to ground or chassis.

The output of multiplex stage 28 is connected to the reset input of the first FF 18 and additionally to control a semiconductor switch 50 in circuit with ignition coil 51. This control connection from the output of multiplex stage 28 is through a monostable FF 30, forming a timing stage, the output of which is connected to the input of an AND-gate 31. The timing circuit of the timing stage 30 is shown separately from the block symbol and is, essentially, an R/C circuit having a capacitor 37, and resistors 33, 34, 35, 36. Depending on the resistance value connected to the source of positive supply 27, the timing of the timing circuit 30 will change. Three AND-gates 38, 39, 40 permit selective shunting of respective resistors 33, 34, 35, in steps, thus permitting change of the holding time of the timing circuit 30 in steps. The output of the AND-gate 38 is connected to the junction between resistors 33 and 34; the output of AND-gate 39 to the junction between resistors 34, 35; and the output of AND-gate 40 is connected to the junction between resistors 35, 36. The AND-gates 38, 39, 40 are commonly connected to the source of positive supply. Three selectable input terminals 41, 42, 43 are connected through respective inverters 44, 45, 46 with respective second inputs of the AND-gates 38, 39, 40. The terminals 41 to 43 can be selectively connected to the outputs 0 to 7 of the first decoding stage 13. These connections have been omitted from the drawing in FIG. 1 for simplicity, and to render the figure more readily understandable; only a single broken line is shown. The value stored in decoding stage 13 depends on speed. By suitable connection of the output from decoding stage 13, selected speed signals can thereby be used to change the holding period of the timing circuit 30 — in dependence of engine speed — in order to reduce heating losses in the ignition coil 51.

The first or instantaneous angular position signal transducer 102 is additionally connected through a rectifier 47 to a second input of the AND-gate 31. The input is additionally connected to chassis or reference potential through a parallel R/C circuit 48, 49.

The output of the AND-gate 31 is connected to the control input of switching transistor 50, forming a semiconductor electrical switch. The collector of transistor 50 is connected to the primary of ignition coil 51, and hence to the positive terminal 27, for example the battery of an automotive vehicle. The emitter of transistor 50 is connected to ground or reference voltage. The primary winding is connected additionally with one terminal of the secondary, the second terminal of which is connected to a spark gap 52; in a multicylinder automotive application, a distributor, as known, would be interposed between the output from coil 51 and spark plugs represented, in the drawing, collectively by spark gap 52.

Figure 2:
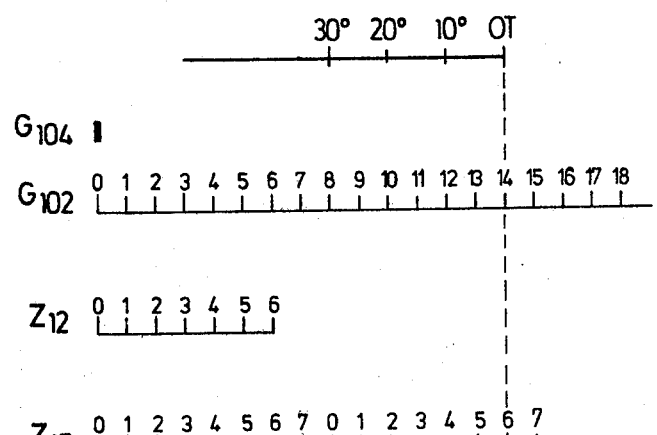
FIG. 2 is a graph illustrating counter states of the counters of FIG. 1.
Figure 3:
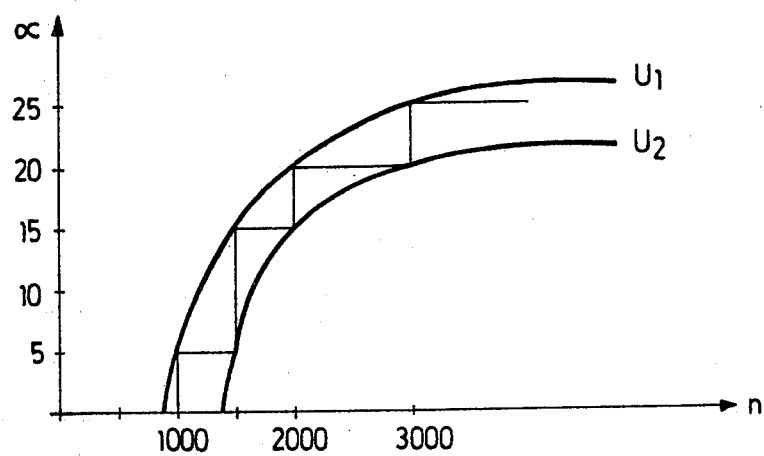
FIG. 3 is a graph showing, for various typical engine speeds, the change in ignition angle advance and illustrating characteristics obtainable by the system of FIG. 1.

Operation, with reference to FIGS. 2 and 3: The customary notation used in digital technology will be employed; a 1-signal corresponds to a signal essentially of the level of the supply, for example supply 27; a 0-signal corresponds to ground, chassis or reference voltage.

Engine speed information is obtained by utilizing timing stage 17, for example a monostable FF. Upon generation of a marker pulse from the second transducer 104, timing stage 17 is started. During the timing interval of stage 17, pulses from the first transducer 102 are applied through the AND-gate 11 to the count input Z of the first counter 12, to be counted therein. Upon expiration of the timing interval, the count number stored in count 12, and decoded in decoding stage 13, will provide an output number representative, in decimal form, of engine speed. The output from decoding stage 13 is an inverted output in that, for the selected output representative of engine speed, a 0-signal will appear, whereas all other outputs will have a 1-signal.

Generation of the marker pulse by the second transducer 104 also applies the pulse to the first FF 18, setting the FF 18. This opens the AND-gate 14 so that the first transducer 102 can apply its output pulses to the count input Z of the second counter as well. The marker pulse from the second transducer 104 additionally causes resetting of the second FF 19 so that the blocking and strobe input of the multiplex stage or memory stage 28 will block any output therefrom. Each pulse represents an angular position and, hence, the second counter 15 and the associated decoding stage provide output information, in decimal digital form representative of instantaneous angle of the position of the crankshaft of the engine.

The signals derived from the two transducers 102, 104 are shown in FIG. 2. As an example, the spacing between teeth of the wheel 101 has been selected to be 5°. The subdivision of disk 100, for example the starter gear, can be finer or more coarse. In the example selected, the counters 12, 15 are 4-bit counters which, for example, can be elements SN 74 154 N. A suitable multiplex or memory unit 28 can then be 74 150 N. If the subdivision is finer, counters 12, 15 must have a greater count capacity.

The counter stage 12 can count only until the output 6 of the decoding stage 13 provides a 0-signal. This 0-signal is applied to terminal 29 and then to the AND-gate 11 which, then, will block and inhibit further application of counting pulses to the Z or counting input of counter 12. Thus, as far as the speed characteristic curve is concerned, no change in the ignition angle timing can occur thereafter.

The decoding stage 16 will continue to decode the count outputs of second counter 15 and will, eventually, reach its highest count stage, count 7. When decoding stage 16 reaches count stage 7, counter 15 is reset through the inverter 21, OR-gate 22 and OR-gate 20. It thereupon commences to count again starting from the start value of zero. Resetting of the counter 7, additionally controls the second FF 19 so that FF 19 will be SET. This cancels the blocking of the multiplex output through the blocking and strobe input terminal and permits outputs from the multiplex or memory stage 28 to be propagated. A second count cycle will now begin. The second count cycle only requires counting in the second counter 15. The second counter 15 will now count to the value which corresponds to the value stored in the multiplex stage 28, and as applied by the decoding stage 13 in accordance with the logic interconnection therefrom. When the count in counter 15, upon the second count cycle, reaches the value stored in multiplex stage 28, an output signal or pulse will occur at the output terminal thereof which is applied, on the one hand, to the timing circuit 30 for control of switch 50 and, additionally, is connected back to reset the first FF 18 causing blocking of the AND-gate 14 and inhibiting application of further count pulses to the counter 15. Thus, when the second counter 15, in the second count cycle, has reached the count stage which matches that one which has been stored during the first speed counting, an ignition event is triggered through timing circuit 30 and AND-gate 31 by control of switch 50; energization is effected by the connection from the first transducer 102 to the AND-gate 31.

The specific characteristic ignition advance, with respect to engine speed, is obtained by suitable interconnection of the output terminals 0 to 7 of the decoding stage 13 with the input terminals 0 to 7 of the multiplex and memory stage 28. A typical characteristic curve is illustrated in FIG. 3. The interval of the timing circuit 17 is so selected that each count stage in the counter 12 corresponds, for example, to a speed of 500 rpm of the IC engine.

The outputs 0 and 1 of the decoding stage 13 are left blank. The input 6 of the multiplex stage 28 is connected to ground or reference voltage. Let it be assumed that the speed of the engine is below 1000 rpm. For all speeds below 1000 rpm, therefore, ignition will occur at UDC position of the respective piston since the second counter 15, in the second count cycle, will count up to the value 6 since the 6-input of the multiplex stage 28 is connected to ground or chassis, representative of a zero signal from decoding stage 13. The decoding stage, at levels below 1000 rpm, will have reached only numeral 1.

As the speed increases and reaches 1000 rpm, the decoding stage 13 will reach numeral 2. This permits the second counter 15, during the second count cycle, to count up to number 5, since the 2-output from decoding stage 13 is connected to the 5-input of multiplex stage 28. When the second count cycle of the second counter 15, thus, has reached the count number 5, an output pulse will be applied from the multiplex stage 28 to the timing circuit 30 and hence to switch 50. This corresponds to an ignition advance angle of 5° (see FIG. 3). The output 3 of decoding stage 13 is connected to the 3-input of multiplex stage 28. Thus, if the first counter counts to 3, the second count cycle of the counter 15 can also count to 3 and will then already trigger an ignition event. Thus, starting from a speed of 1500 rpm, the ignition advance angle will be 15°.

The further shape of the ignition adjustment characteristic can readily be determined in similar manner by considering the wiring of the decoding outputs of stage 13 to the inputs of the multiplex stage 28. These connections can be changed. The inputs and outputs, respectively, of decoding stage 13 and multiplex stage 28 can be suitably varied in order to obtain any desired ignition timing characteristic curve. Thus, a single system may be provided for various types of engines, and the interconnection between decoding stage 13 and multiplex stage 28 only need be changed to match the ignition advance, as controlled by the system, to a specific engine. In the example shown, the envelope curves U1 and U2 indicate the range between which the ignition adjustment characteristic will move. A smaller tolerance requires a finer subdivision of the marker teeth 101 on disk 100 and counter stages 12, 15, with a higher bit-capacity.

Effect of operation of switch 25: Switch 25 is an operating parameter switch which can be used to shift the entire characteristic, by raising or lowering the characteristic (with respect to FIG. 3). Switch 25, for example, can be used to compensate for substantial vacuum in the induction pipe of the IC engine. Upon closing of switch 25, for example upon operation of a vacuum switch, the associated input of the NOR-gate 24 provides an output signal which changes from a 1-signal to a 0-signal. The output Q1 of the second FF 19, and thus a further input of the NOR-gate 24, has a 0-signal during the first count cycle of the second stage 15. When the second stage 15, during the first count cycle, reaches the number 5, the third input of the NOR-gate 24 also will have a 0-signal applied thereto. The OR-gate 22 and OR-gate 20 will thus reset the second counter 15 already at the count stage 5 — rather than at its normal terminal count stage 7 — so that the second count cycle of the counter 15 will commence two marker teeth 101 earlier than if switch 25 were not closed. This effects a shift of the entire characteristic by 10° upwardly (with respect to FIG. 3). By suitable connection of terminal 23 with one of the outputs of the second decoding stage 16, any desired shift of the characteristic can be obtained upon closing of switch 25. It is also possible to drop or lower the characteristic curve of FIG. 3 rather than raising it; to drop the characteristic curve — with respect to FIG. 3 — terminal 23 must be connected to a higher numerical decoding output terminal than the connection to the inverter 21. In order to lower the curve, inverter 21 is then connected to a terminal which does not correspond to the highest output terminal, that is, output 7, but rather to a lower one such as outputs 5 or 6; terminal 23 is then connected to terminal 7.

More than one switch connection, similar to switch 25 and connected through a resistor 26 to the NOR-gate 24, may be used in the circuit, and selectively controlled by different operating parameters, to raise or lower the curve of FIG. 3 in accordance with the connection of the additional switch to the decoding stage 16.

Application of the 0-signal, selectively, to terminals 41, 42, 43 will effect selective shunting of the resistors 33, 34, 35, and thereby change the timing interval or timing period of the timing circuit 30 to be shorter. The timing circuit 30 has an output signal which changes from a normal 1-signal to a 0-signal during the timing interval. Upon change to the 0-signal, the switch 50 will open through the AND-gate 31, and induce an inductive kick in the secondary of coil 51 to cause flash-over of the spark gap 52. The open time of the coil is thus determined by the timing period or timing interval of the timing circuit 30, and thus determines the duration during which sparks can flash over across spark gap 52. After termination of the timing interval of timing circuit 30, switch 50 will again close and the magnetic field in ignition coil 51 can again build up. To decrease losses in the coil, the open period of the coil 50 should be reduced as the speed of the engine and hence the speed of disk 100 increases. To reduce this open time, the timing interval of timing circuit 30 is likewise reduced by connecting selected outputs of decoding stage 13 with the terminals 41, 42, 43, as merely shown schematically by the broken line in FIG. 1. The stored counter state at the output of the decoding stage is representative of speed of the disk 100 and, therefore, terminals 41, 42, 43 can be controlled by a speed-dependent signal.

The rectifier 47 charges capacitor 49 so long as pulses are derived from the first transducer 102. At the same time, the capacitor 49 will discharge over resistor 48. The value of the discharge resistor 48 is so selected that the discharge time is longer than the time required to completely discharge the capacitor after each pulse. Thus, the AND-gate 31 will have a 1-signal applied to its second terminal during rotation of the engine, and hence of disk 100, so that pulses are generated. If the disk 100 stops, pulses no longer are derived from the transducer 102, and the capacitor 49 can completely discharge over resistor 48. At the associated input of the AND-gate 31, therefore, the signal applied will be a 0-signal so that the AND-gate 31 will block. The transistor switch 50 is thus open when the disk 100 and hence the engine are stopped. This arrangement inhibits current flow through the transistor switch 50 and hence through ignition coil 51 when the engine does not rotate.

The timing of timing stage 17 can be changed and, if this timing interval is controllable, shift of the entire characteristic curve (FIG. 3) can also be obtained, since the holding period or timing interval period of stage 17 controls association of speed to the counter state of the first counter 12.

Only a single operating parameter switch 25 is shown. Further switches, connected with outputs of the decoding stage 16, can be used in order to introduce further parameters or other threshold values of a single parameter to shift the characteristic curve (FIG. 3).

Various changes and modifications may be made within the scope of the inventive concept.

We claim:

1. Adjustable timing injection system for an internal combustion engine having
   means (10, 100, 101, 102) generating a plurality of signals representative of instantaneous angular position of the crankshaft of the engine;
   timing means (17) receiving said plurality of signals and generating speed signals containing information regarding the speed of operation of the engine;
   means (10, 100, 103, 104) generating an angle marker signal containing information regarding the angular position of the crankshaft of the engine with respect to a reference position (UDC);
   an ignition coil (51) and at least one spark gap (52) connected to the secondary thereof to provide a spark at a predetermined ignition instant with respect to said reference position;
   a controlled switch (50) connected in the primary circuit of the ignition coil (51) which, upon change of state, controls generation of an ignition event and hence a spark at the spark gap (52);
   and means changing the iming of said ignition event with respect to the reference position comprising
   a first counter stage (12) and a second counter stage (15),
   the counter stages (12, 15) having a count capacity which is less than the number of signals developed by said instantaneous position signal generator means (10, 100, 101, 102) for any one ignition event after generation of said marker pulse, and said counters being automatically resettable upon reaching a predetermined count state so that, for any one ignition event, at least one counter stage will count through sequential count cycles;
   first logic means (11) connected to the input of said first counter stage (12),
   the speed signal being connected through the first logic means (11), to the first counter stage (12) to cause the first counter stage to count and provide a digital output representative of the speed of the engine;
   second logic means (14, 18) connected to the input of said second counter stage (15),
   count control means (21, 23; 24, 22, 20) connected to said second logic means (14, 18) and controlling the connection of said second counter stage (15) to the instantaneous signal generator means (10, 100, 101, 102) to control the counting sequence of said second counter stage (15) by the instantaneous angle position signal being counted thereby, and to connect the plurality of instantaneous angle position signals through the second logic means (14, 18) to the second counter stage (15) to cause the second counter stage to count through sequential count cycles after occurrence of said marker signal;
   a memory stage (28) connected to the outputs of both said counter stages (12, 15) and having an output connected to control the controlled swith (50);
   connection means (13) connecting the first counter stage (12) and said memory or storage stage (28),
   the memory stage storing the count output of the first counter stage (12) during a first count cycle thereof and providing an output signal to the controlled switch (50) when, during a subsequent count cycle, the input from the second counter stage (15) has reached a predetermined relation to the count stored in the multiplex or memory stage;
   and blocking means (19) connected to one of the counter stages (15) and to the memory stage (28) and inhibiting output of the memory stage (28) during the first count cycle of the respective counter means and while the count from the first counter stage (12) is being stored in the memory stage (28).

2. System according to claim 1, wherein said count control means comprises means (22, 20) resetting the second counter (15) when said counter has reached a predetermined count state.

3. System according to claim 2, wherein the connection means comprises first decoding stage.

4. System according to claim 3, wherein the output of the first decoding stage (13) is connected to the input of the first logic means (11) controlling said first counter stage (12) to permit selective resetting of said first counter stage.

5. System according to claim 3, wherein the first decoding stage (13) is selectively connectable to the inputs of the memory stage (2S) to permit selectively different engine speed-vs.-ignition advance characteristic curves to be obtained by generating selectively different transfer functions between the output of the first counter stage (12) and the values stored in the multiplex or storage stage (28).

6. System according to claim 5, further comprising an operating parameter control switch (25) connected to said third logic means (19) to reset said second counter stage (15) at count stages, as decoded by said decoding stage (16) in accordance with the connection of said operating parameter control switch to the decoding stage (16).

7. System according to claim 6, further including means connecting an output from said second decoding stage (16) to said third logic means (19) to provide for resetting of said second counter stage (15) in accordance with the count number connection of said decoding stage (16) to said third logic means (19).

8. System according to claim 1, wherein the blocking means (19) is connected to the second counter stage (15).

9. System according to claim 1, wherein the count capacity of said counter stages is about half of the number of signals developed by said signal generator means upon rotation of the engine from the position at which said angle marker signal is generated to said predetermined reference position.

10. System according to claim 1, further comprising an operating parameter control switch (25) connected to said count control means (21, 23; 24, 22, 20) to independently control counting of the second counter stage (15) and hence the count state thereof as a function of the position of said operating parameter control switch (25) to additionally and independently control the count introduced into the memory stage (28) by said second counter means (15).

11. System according to claim 1, wherein the second logic means (14, 18) is controlled by a signal from the angle marker generating means to control the associated second stage (15) to commence counting;
   and the second logic means is additionally controlled by the output signal from the memory stage (28) to command said second counter stage to discontinue counting.

12. System according to claim 1, further comprising a second decoding stage (16) connected to the output of said second counter stage (15).

13. System according to claim 12, further comprising a third logic means (19) connected to said count control means (21, 23; 24, 22, 20) and controlled thereby, the output of said third logic means logically resetting the second counter stage (15) and controlling said blocking means (19) to unblock upon the second count cycle of the second counter stage (15) and permit output signals from said memory stage (28) to pass to the controlled switch (50).

14. System according to claim 13, further comprising means connecting said third logic means (19) and angle marker signal generating means (10, 100, 103, 104) to control logic switching of said third logic means.

15. System according to claim 1, further comprising a timing circuit (30) interposed between the output from said memory stage (28) and said controlled switch (50), the timing circuit providing for an open-time of said switch as determined by the timing interval thereof.

16. System according to claim 15, wherein said timing circuit (30) includes selectively controllable timing elements (37; 33, 34, 35; 38, 39, 40; 41, 42, 43, 44, 45, 46), and connection means selectively connecting said controllable timing elements as a function of the count in said first count stage (12) to vary the open-time of said controlled (12) as a function of speed of the engine.

17. System according to claim 16, further comprising a first decoding stage (13) connected to said first counter stage (12);
and wherein said selectively controllable timing elements include selectively controlling timing circuit portions (37; 33, 34, 35, 36) and logic connection means to logically connect the output of said first logic stage (13) to said timing circuit portions.

18. System according to claim 17, wherein said timing circuit portions comprise R/C circuit portions.

19. System according to claim 1, further comprising a stopped-engine interlock circuit (47, 48, 49; 31) connected to said instantaneous position signal generating means (10, 100, 101, 102) and to said controlled switch, said stopped-engine interlock circuit inhibiting closing of said controlled switch and hence current flow through the ignition coil (51) unless said instantaneous position signals are supplied by said signal generator means.

20. System according to claim 19, wherein said stoppedengine interlock circuit comprises a capacitor (49) and a discharge circuit (48) therefor, and means (47) charging said capacitor as a function of instantaneous angular position signals, the discharge rate of said discharge circuit being longer than the charge rate by said instantaneous position signals to provide
 (a) a signal if instantaneous angular position signals are sensed and
 (b) absence of said instantaneous angle position signals will cause discharge of said capacitor and blocking of said controlled switch (50), thus inhibiting current flow through said ignition coil (51).

* * * * *

UNITED STATES PATENT AND TRADEMARK OFFICE
CERTIFICATE OF CORRECTION

PATENT NO. : 4,127,092
DATED : November 28, 1978
INVENTOR(S) : Jürgen FRESOW et al It is certified that error appears in the above-identified patent and that said Letters Patent are hereby corrected as shown below:

Claim 5, column 10, line 23, "multiplex or storage" should be -- memory --.

Page 1 [54], line 3, delete "SWIT" after "IGNITION" should read -- ADJUSTABLE TIMING ELECTRONIC INTERNAL COMBUSTION ENGINE IGNITION SYSTEM"

Signed and Sealed this

Twelfth Day of June 1979

[SEAL]

Attest:

RUTH C. MASON
Attesting Officer

DONALD W. BANNER
Commissioner of Patents and Trademarks